Jan. 8, 1952     W. E. DUNCAN     2,582,196
TIME MEASURING DEVICE
Filed April 5, 1948     4 Sheets-Sheet 1
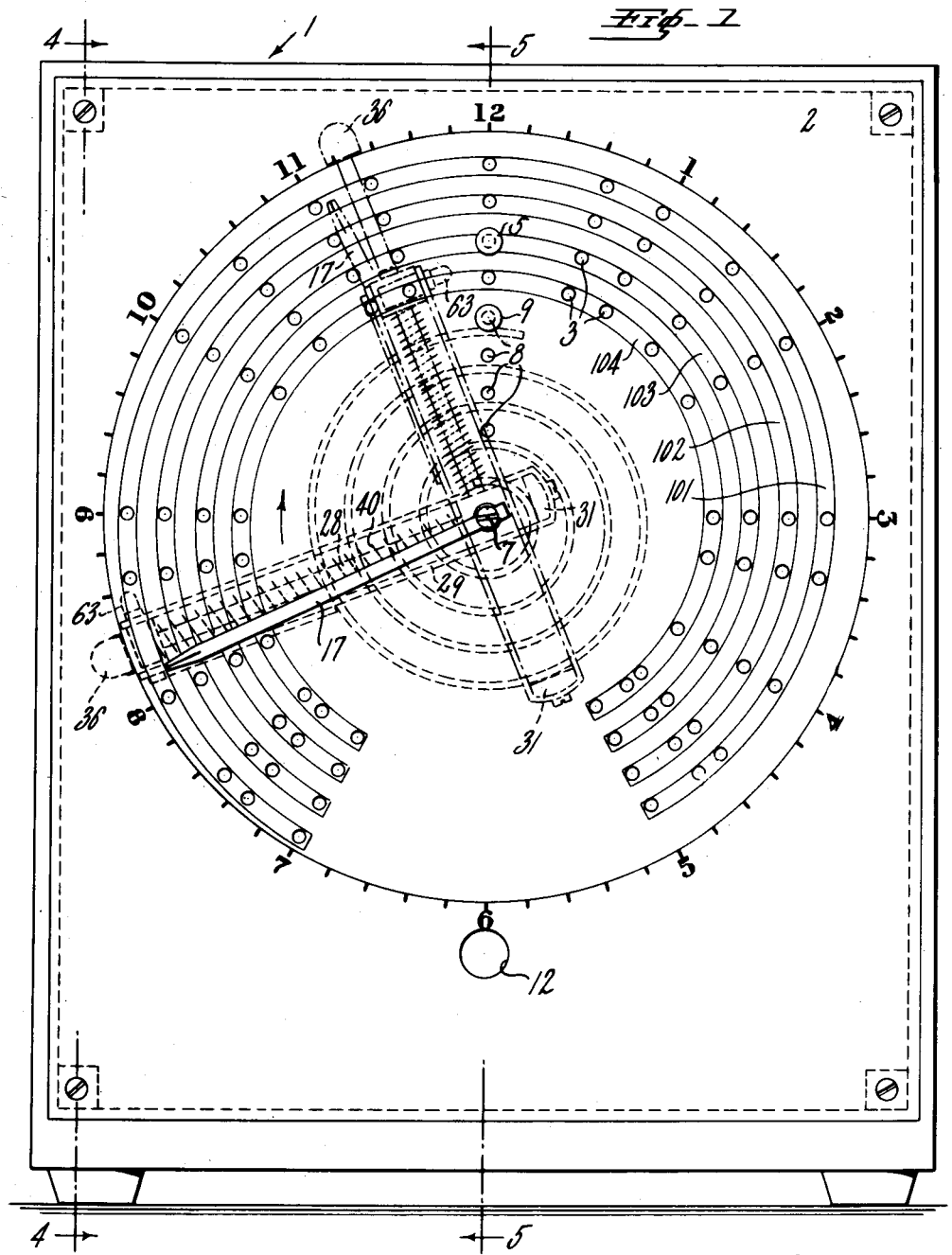
INVENTOR.
WILLIAM EARL DUNCAN
BY
*Darby - Darby*
ATTORNEYS Jan. 8, 1952 W. E. DUNCAN 2,582,196
TIME MEASURING DEVICE
Filed April 5, 1948 4 Sheets-Sheet 2
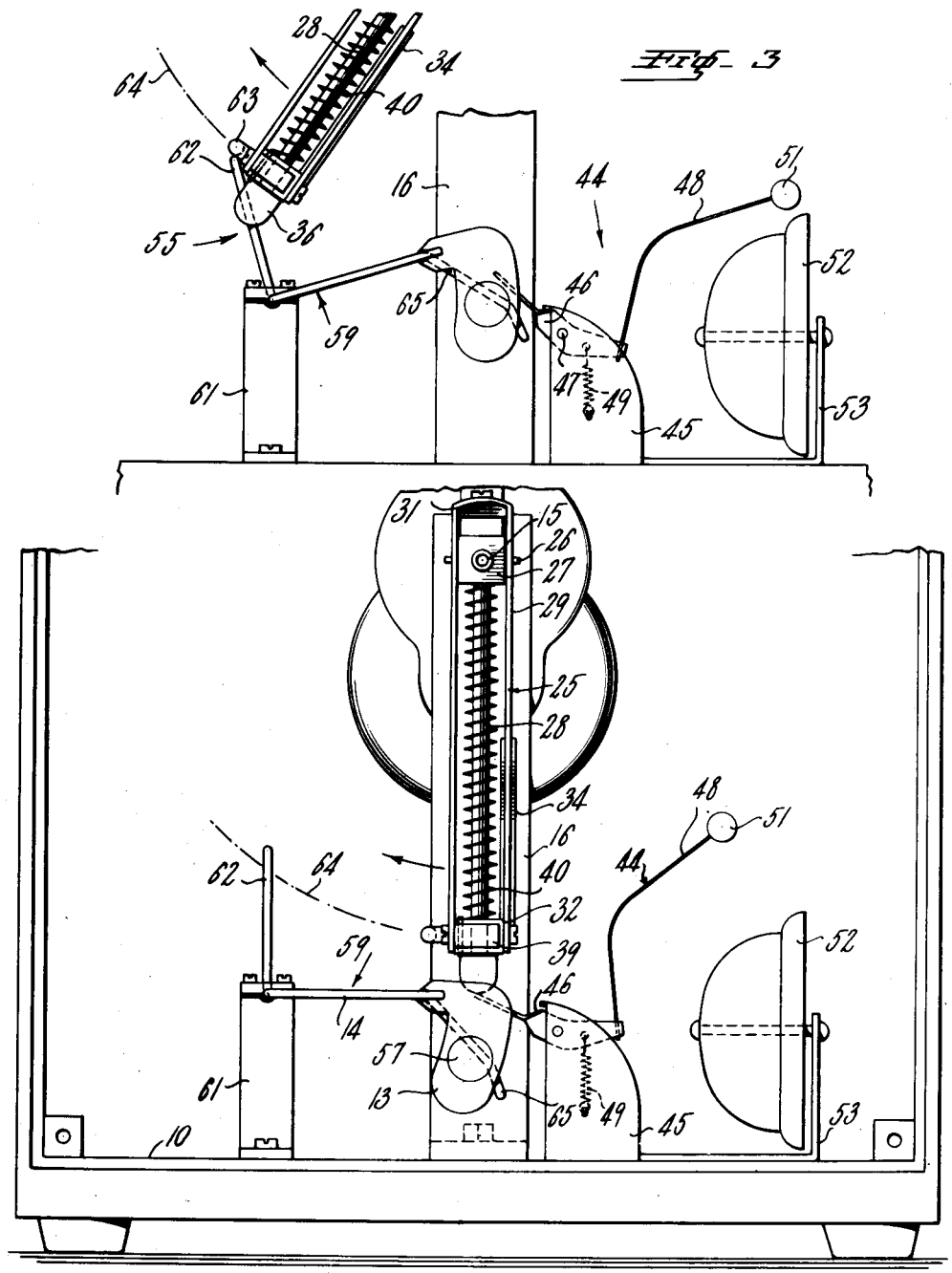
INVENTOR.
WILLIAM EARL DUNCAN
BY Darby & Darby
ATTORNEYS Jan. 8, 1952     W. E. DUNCAN     2,582,196
TIME MEASURING DEVICE
Filed April 5, 1948     4 Sheets-Sheet 3
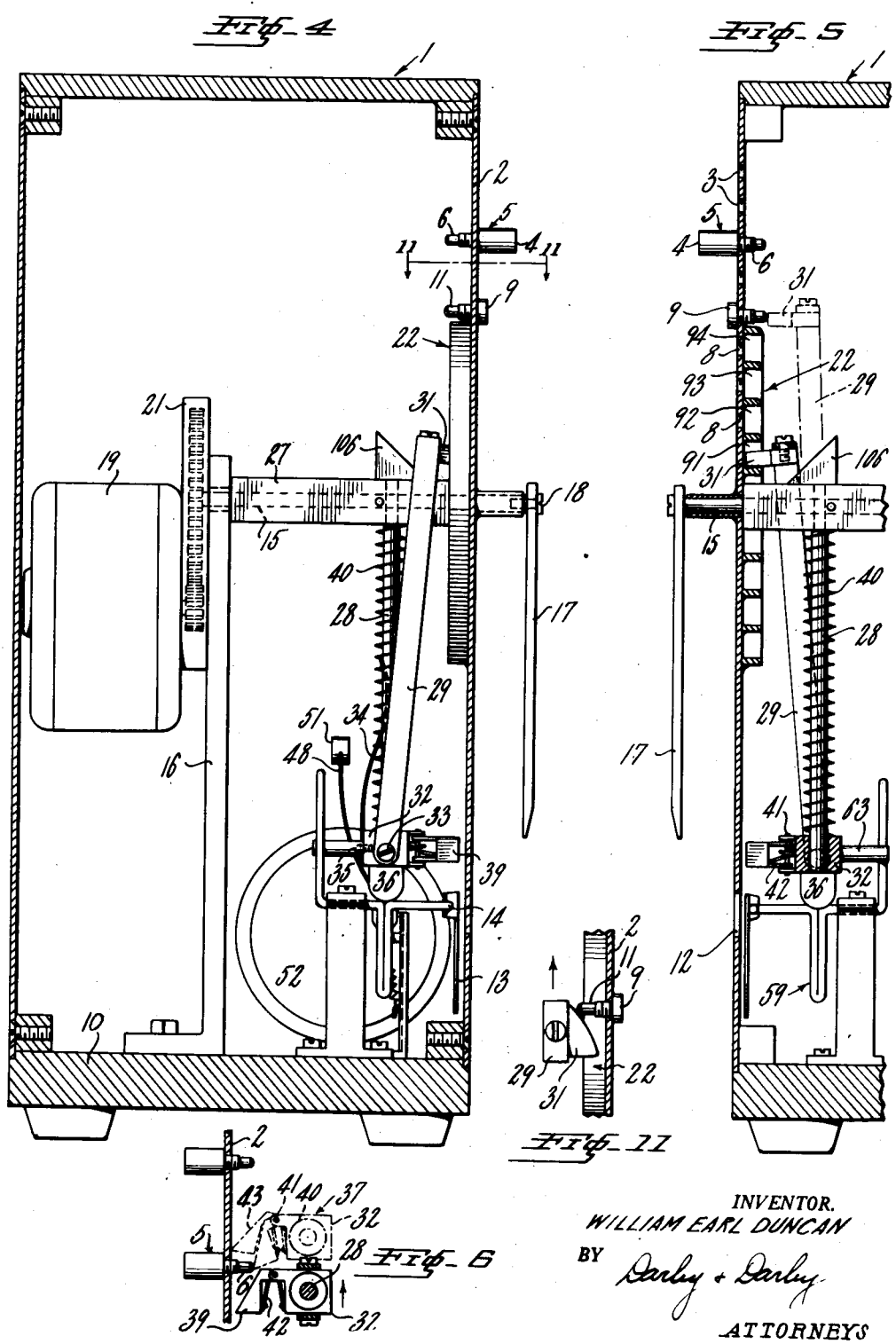
INVENTOR.
WILLIAM EARL DUNCAN
BY Darby & Darby
ATTORNEYS Jan. 8, 1952     W. E. DUNCAN     2,582,196
TIME MEASURING DEVICE
Filed April 5, 1948     4 Sheets-Sheet 4
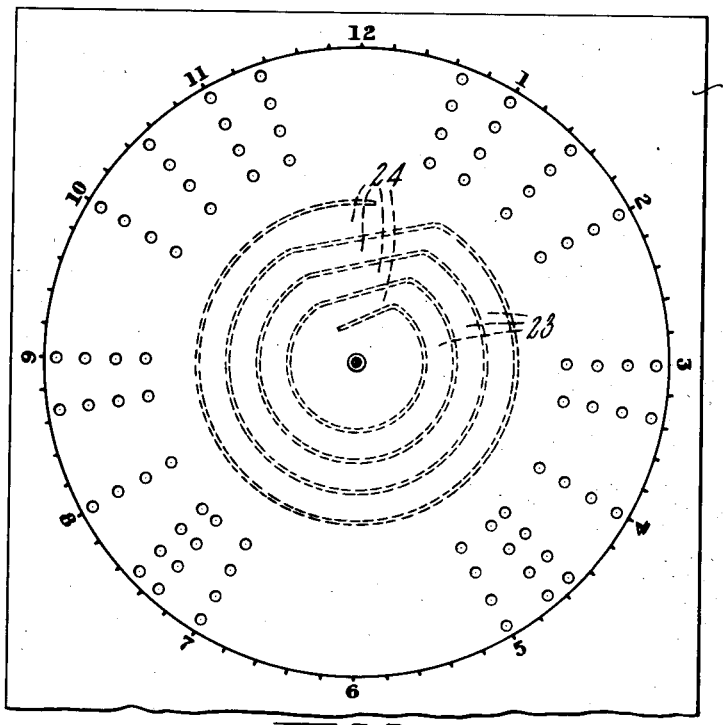
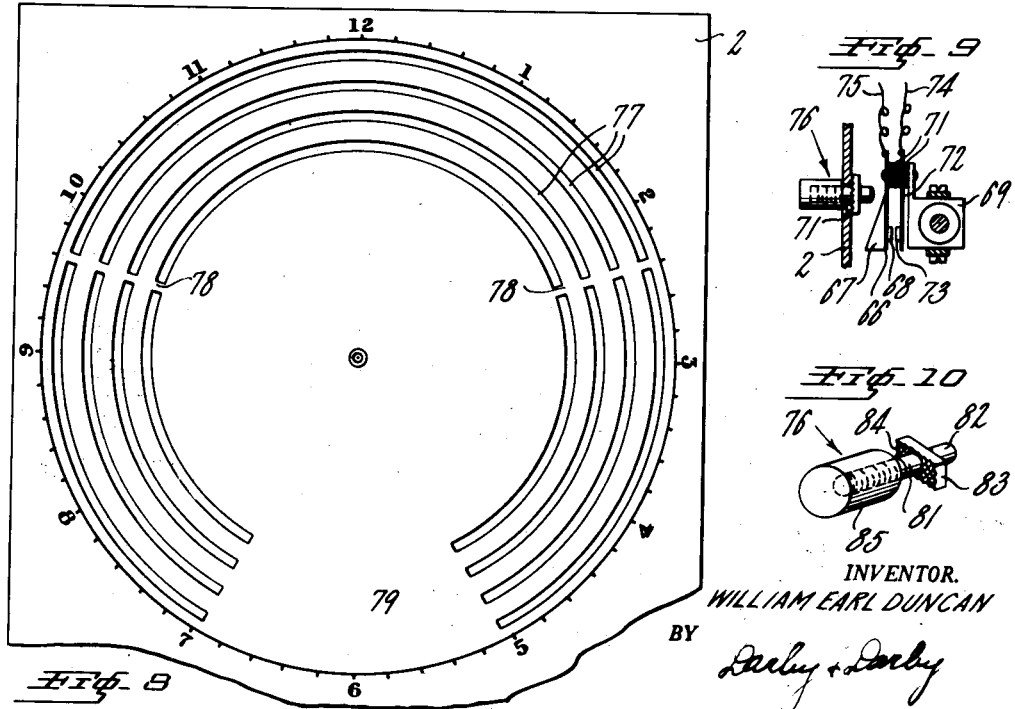
INVENTOR.
WILLIAM EARL DUNCAN
BY
Darby & Darby
ATTORNEYS Patented Jan. 8, 1952

2,582,196

UNITED STATES PATENT OFFICE 2,582,196

TIME-MEASURING DEVICE

William Earl Duncan, Sea Cliff, N. Y.

Application April 5, 1948, Serial No. 19,047

20 Claims. (Cl. 161—6)

This invention relates to a time measuring device, and more particularly to a device for indicating intervals of time between sounds.

The usual timing device for use, for example, in musical instruction, such as a metronome, produces beats or sounds which are spaced apart by equal intervals of time. For primary and basic instruction, these devices have been found somewhat useful, but for more intricate patterns of musical or other sound intervals, they are not adaptable to varying musical time intervals. For example, if all of the beats in a measure succeed each other at regular and equal intervals a metronome may be adjusted so that its beats or clicks coincide exactly with the beats of a measure. When the notes or beats are at irregular intervals within a measure, or within a complete composition, the metronome is not of assistance to the student or the musician in imparting to him exactly the moment at which the note is to be struck or played. Furthermore, devices such as the metronome do not keep the musician apprised of the first beat of each measure.

While my invention is primarily useful in the instruction and interpretation of the time, rhythm and tempo of musical composition, it is by no means limited to the musical field. I have provided an apparatus for measuring time which can be easily adjusted by the operator to reproduce exactly all of the notes within a measure, or within a series of measures or within a part of a measure, whether or not those notes are equally spaced, are fractions or multiples of fractions of one another and whether or not they coincide with one or all of the primary beats within the measure. My apparatus further signals to the observer exactly which of the notes occur within the first measure or the first predetermined fraction of a series of measures. My apparatus also audibly imparts the timing of each beat as well as the timing of a note between beats, known as the rhythm. For example, 3:4 time has three beats per measure and 4:4 time has four beats per measure. By proper adjustment of my apparatus, the notes or the beats may be visually and/or audibly recorded or imparted.

The device of this invention is especially useful in musical instruction, and is particularly useful to small or large orchestras, as well as the members thereof, in establishing particular patterns of rhythm, and especially complicated ones. The device may also be used as a signalling device, for example in institutions where a particular pattern of rhythm or timed spaces, as by bells or lights in factories or hospitals, is to be repeated at will.

Referring to the drawings—

Figure 1 is a front elevational view of the device, the dotted line showing the rider arm in two different positions;

Figure 2 is a front elevation of the device with the face plate removed;

Figure 3 is a detail of Figure 2, showing the operation of the beat tripper and signal arm;

Figure 4 is a cross section taken along the line 4—4 of Figure 1;

Figure 5 is a cross section taken along the line 5—5 of Figure 1;

Figure 6 is a detail of the sounding device attached to the rider;

Figure 7 is an alternative embodiment of a face plate with associated track;

Figure 8 is an alternative embodiment of a face plate;

Figure 9 is a view, partly in section, of an alternative embodiment of a signalling device;

Figure 10 is an alternative form of plate projection or pin; and

Figure 11 is a cross section taken along the line 11—11 of Figure 4.

Referring specifically to Figures 1 and 4, the apparatus comprises generally a box or housing 1 having a face plate 2 which has a number of perforations 3 extending therethrough. The perforations 3 accommodate projection pegs 5 which comprise a head 4 larger than the opening 3 and a shaft 6 which fits tightly, but removably, in the opening 3. The perforations 3 are preferably arranged in radial rows of equal numbers, and for most musical patterns or configurations four is a desirable, though not a mandatory, number. In addition, the first of each of said rows of perforations lies in a path concentric with a fixed center 7. The second perforation in each radial row similarly lies in an adjacent concentric path. The other respective numbers of each radial row are similarly arranged with respect to each other. The concentric paths may be preferably concentric circles as shown in Figure 1 or they may be convolutions of a spiral whose center is 7.

Another single row of perforations 8, having the same number of perforations as in the typical radial row of perforations 3 is provided for the purpose described below. A projection pin 9 is normally inserted in one of the perforations 8 and is similar to the pin 5 except that the shaft 11 is preferably longer than the shaft 6.

A window 12 is provided in the face plate 2 for observance of a signal flag 13 secured to a movable signal arm 14.

A rotatable shaft 15 is conveniently journalled near one end into bracket 16, and at the other end into the face plate 2. The shaft 15 preferably extends through the face plate to support at its end a pointer 17 adjustably secured thereto by a set screw 18. The shaft 15 may be driven by any suitable or convenient means, such as an electric motor 19 and reduction gear 21, or by a hand crank, or both. The speed of the driving means, such as the motor may of course be adjusted at will (not shown).

Secured to the inner wall of the face plate 2, as by welding, or integrally as by casting, is a track 22 which is preferably spiral in configuration as shown in Figure 1. If desired, the track may comprise other generally concentric convolutions, as shown exemplarily in Figure 7. In this alternative embodiment, the convolutions 23 are principally concentric circles connected by ramps 24 for continuous translation of a rider element from one circle to another. The terms "concentric convolutions" or "concentric paths" as used herein denote either the path of connected concentric circles or a spiral path. Referring now particularly to Figures 2-5, the shaft 15 carries a rider arm assembly 25 which rotates with the shaft. The rider arm is secured to the shaft by a peg 26 extending through the shaft and through a block 27 surrounding the shaft into which the rod 28 is fastened. The rider arm 25 also carries an elevator frame 29 having a lug or track follower 31 which rides in the track 22 as the shaft 15 rotates. A block 32 partly encases the rod 28 and is adapted to ride back and forth along that rod and accommodates the outer end of the elevator frame 29 by bolt 33 attachment to permit the elevator frame to swing pivotally with respect to the rod 28. In the normal operation position, the lug (31) end of the frame 29 is retained within the track 22 by a suitable spring such as the spring 34. The base of this spring is secured to the block 32 by screw 35. The rod 28 terminates in a knob 36 which is always at the same distance from the shaft 15 and drives the secondary sounding device to be described below. A coil spring 40 encases the rod 28 and at one end abuts the shaft 15, while the other end of the spring presses against the block 32 to force the block 32 and hence the elevator frame 29 into the downward position, as shown in Figure 4, when the lug 31 is forced out of the track 22. The shoulder of the knob 36 stops the outward motion of the block and frame when the lug is released from the track.

Also secured to the block 32 is a primary signalling or sounding device shown in detail in Figures 6 and 11. As the shaft rotates the rider arm, the primary sound device 37, which in a particular embodiment of the invention may be designed to produce a clicking sound, comes in contact with, and passes by, a peg or pin 5 which is screwed into a perforation in the face plate 2. The primary sounding device comprises a knocker 39 pivoted at 41 to block 32 and retained in the normal position by hair spring 42. As the sounding device 37 travels in the direction of the arrow in Figure 6, the forward cam surface 43 of the knocker is forced back from its normal position against the tension of the spring by sliding contact with the projection 6 of the pin 5. As the knocker clears the pin, the spring recoil forces the knocker to hammer against the inner face of the plate 2, as shown in the dotted lines in Figure 6. The tension of the spring is designed to produce a single clicking sound as the sounding device passes each pin. If desired, the knocker or hammer may be arranged to hit a surface on the moving rider arm assembly. As the pin clicks the hammer, the position of the pointer on the outside of the device over the head of the pin visually indicates the information.

A secondary sounding device 44 is shown in Figures 3 and 4. A bracket 45 secured to the base 10 carries a lever arm 46 pivoted at 47 thereto. In its normal position, the upper end of the lever arm lies in the path of travel of the knob 36. When the knob engages the lever arm, the upper end of the arm is depressed and the lower end carrying a hammer arm 48 is raised against a spring 49 secured at one end to the lower side of the lever arm 46 and at the other end to the bracket 45. After the knob 36 has traveled past the lever arm 46, a hammer 51 secured to the hammer arm 48 strikes a bell 52, which is illustrated in Figure 3 as being supported by a bracket 53 mounted on the base 10.

A visual signal assembly 55 cooperates with the window 12 in the face plate 2. A rigid flag 13 bearing an emblem 57 is secured to the arm 14 of a bent rod 59. The emblem 57 is preferably colored to contrast with the exterior of the face plate 2: for example, the face plate may be black and the emblem white. The rod 59 is horizontally journalled in a column 61 secured to the base 10. The free upstanding end of the rod 59 as indicated at 62 is so designed that it lies in the path of travel of the block 32 during the first revolution of the shaft 15, as shown in Figure 3. The block 32 is provided with an extending signal-engaging arm 63 which engages the extension 62 whenever the arm 63 travels in the path indicated at 64 in Figures 3 and 4. Secured to the flag 13 is a cam 65 which during the major portion of operation of the device is situated below the path of travel of the knob 36. In operation, the signalling device 55 permits the flag 13 to be raised as the arm 63, during the first revolution of the shaft 15, engages the free end 62 of the rod 59. On the next revolution of the shaft 15, the frame 29, and hence all of its associated parts such as the signal-tripping arm 63, is travelling on a different path of lesser diameter which causes the arm 63 to clear the signal device 55. However, at the beginning of this second revolution, the knob 36 depresses the lever 46 which in turn depresses the cam 65 adjacent the flag 13 and forces the flag down into its normal position and also forces the free arm 62 up into its normal position. The visual signalling device 55 does not then operate during successive revolutions of the shaft 15 until the lug 31 has been returned into the innermost convolution of the track 22.

Figure 9 illustrates an alternative primary sounding or signalling device. The knocker has been replaced by a spring bar 66 carrying a cam 67 and a contact point 68. The assembly is travelling upward, as shown in the view, with respect to the face plate 2. The block 69 corresponding to block 32 supports insulators 71 carrying a contact bar 72 having a contact point 73. Wires 74 and 75 connect with an electric circuit (not shown) which may actuate any visual or audible signalling means when the cam 67 passes the projection on a pin 76, thereby closing the circuit by contact between the two contact points. This arrangement may also be connected to interrupt an otherwise continuous sounding or lighting device (such as a signboard), as the primary switching (or sounding) device passes a projection in the plate.

An alternative face plate is illustrated in Figure 8, wherein elongated curved slots 77 are substituted for the perforations in the face plate 2. An almost infinite variety of pin adjustments may be obtained with this arrangement. Continuously solid portions 78 of the face plate provide rigidity in spite of the elongated slots. The solid portion 79 may of course be differently positioned or of different proportions from those shown in Figure 8.

Figures 9 and 10 show the pin 76 as a locking pin. This pin is particularly useful in the slot structure of Figure 8, but of course may be used in face plates having a series of perforations 3. The pin 76 comprises a shaft 81 terminating in a sounding projection 82 and having affixed thereto a block 83, the inner face 84 of which is roughened to prevent slippage when the pin is tightened. The other end of the shaft 81 is threaded to accommodate a head 85 which projects from the outer face of the face plate 2. The shaft 81 is preferably of less diameter than the width of the slot 77, and the width of the block 83 is such as to slip through the slot 77. The pin 76 then is readily secured at the desired position in any of the slots 77 by inserting the shaft and the block through the slot, twisting the shaft to prevent the block from slipping out again and tightening the head 85 on the screw threads of the shaft 81.

In order to understand easily the operation of this invention, reference is made to the numerals 1-12 printed on the face plate. The track 22 has concentric paths 91, 92, 93 and 94. Similarly, the apertures 3 are arranged about corresponding concentric circles 101, 102, 103 and 104. When the apparatus is adjusted to reproduce a rhythmic pattern in 4:4 time, the pin 9 is most conveniently placed in the uppermost of the four apertures 8. Assume that the time intervals between beats during this 4:4 measure are to be expressed in forms of twelve hour sweeps around the face of a clock as shown in Figure 1. Path 101 represents the first beat of the measure, path 102 the second beat, and similarly for the two remaining beats. Assume that the sound signalling the beginning of each beat is to be the ring of a bell at six o'clock; that the first measure begins with an eighth note and is followed by two sixteenth notes. Pegs or pins 5 will then be placed in apertures 3 in path 101 at twelve o'clock and three o'clock. Assume that the second beat of the measure contains a sixteenth note at the beat followed by an eighth note, followed by two thirty-second notes. Pegs are then placed in the path 102 at nine o'clock, three o'clock and four-thirty. Assume that the third beat consists solely of a quarter note. No pegs will be placed in the path 103. Assume that the quarter note struck at the third beat carries over half of the fourth beat (has a dot after the quarter note signifying half of the value of the quarter note) and is immediately followed by four thirty-second notes. Pegs are then placed in path 104 at twelve o'clock, one-thirty, three, and four-thirty.

The cycle of operation for the pattern of notes just described is that at the beginning of a measure, the lug 31 rides in path 91, which, by reference to Figure 5, is the lowermost position for the elevator frame 29. The knob 36 trips the bell ringing arm 46 and strikes the bell at six o'clock thus signalling the beginning of the beat. As the arm 63 strikes the extension 52 of the rod 59, the flag 13 is raised so that the emblem 57 is seen through the window 12. The flag stays in this position until the first revolution of the shaft 15 has been completed. The block 32 with its associated primary sounding device 37 travels in the path 101 until the knocker 39 clicks against the first pin at twelve o'clock, thereby signalling the striking of the first sixteenth note. The travel of the rider arm assembly continues until three o'clock at which time the second sixteenth note is struck. The beginning of the second beat is signalled by the ringing of the bell again as 36 strikes 46. At the same time, the flag 13 is forced down by 46 depressing the cam 65. As the arm 63 passes the remainder of the flag assembly, it is no longer riding in the path 64 but is traveling in a more inward path determined by the fact that the lug 31 has now ridden into the path 102, thereby lifting the entire elevator frame. The clicker 37 is traveling along the path 102, and the cam 31 along track 92. It then clicks at nine o'clock and again at three o'clock and at four-thirty, which are the positions of the respective pins in 102. At six o'clock the bell is rung again and during the travel of the lug through the next outer convolution 93 of the path 22, the clicker 37 being on the pin-free path 103 engages no pins denoting that a quarter note was struck at the six o'clock beginning of the third beat. As the fourth revolution of the shaft 15 commences, the bell is rung again at six o'clock, signifying the beginning of the dot, later at twelve o'clock, next at one-thirty, then at three and finally at four-thirty.

As the pointer 17 approaches six o'clock in this cycle the lug 31 has moved radially with respect to the shaft 15 and is traveling along the outermost edge of the track 22 and is approaching the projection of the pin 9. As the cam surface lug 31 engages the projection 11 of pin 9, the frame 29 is forced away from the track 22 and the spring 40 expands to release the frame with the lug from the dotted position shown in Figure 5 to the solid position. The spring 34 tends constantly to hold the lug 31 in the track 22, but in order to assure engagement a cam 106 secured to the shaft 15 affords a sliding path for proper reengagement of the lug 31 in the track 91. The top edge of the track may be rounded as shown in Figure 5, to prevent the lug from catching on a lower convolution as the elevator frame descends.

The cycle may be repeated as many times as desired for instructional or other purposes.

Many variations may of course be practiced. The projections 4 on the pins 5 may be of different lengths, so that the distance of displacement of the knocker 39 varies therewith as it is tripped. Accent patterns may be produced thereby, as the rider arm sounding device passes the various length projections, and the clicks are loud or soft or intermediate by predetermined selection. Also, the pointer 17 preferably lies in a plane defined by the position of the primary sounding device 37 and the axis of the shaft 15, although the pointer may be otherwise arranged with respect to the shaft. The paths 101 through 104 are preferably of different colors, so that the observer may determine by casual inspection the pattern denoted by the position of the pins in the respective paths, in order to differentiate between the beats. The radial rows of perforations 3 are conveniently designed to include examples designed to carry the observer from the capabilities of a novice to the standards of a professional. For operation with 3:4 time, the pin 9 may be moved to the next lower aperture 8, so that the innermost path 104 may be eliminated when desired. Similarly, with 2:4 time, the pin 9 may be moved down to the next lower aperture 8.

While certain presently preferred embodiments and examples, of the apparatus have been shown and described, it is intended that the scope of protection afforded the invention be limited only by the appended claims.

What is claimed is:

1. A time measuring device comprising a rotatable shaft, an indicating plate associated with the shaft, a track having concentric convolutions and associated with said plate, a rider arm rotatable with said shaft, a frame slidably mounted longitudinally of said rider arm, a lug extending from the frame and normally engaging said track, projections external to the track and extending from said plate and engaging the path of said rider arm, and a sounding device actuated by contact between said rider arm and said projections, and a projection within said track for disengaging the lug from the track.

2. A time measuring device comprising a rotatable shaft, an indicating plate associated with the shaft, a track having concentric convolutions and associated with said plate, a rider arm rotatable with said shaft and normally engaging said track, projections external to the track extending from said plate and engaging the path of said rider arm, and a sounding device actuated by contact between said rider arm and said projections, said plate having openings extending therethrough for the insertion of pins with said projections.

3. A time measuring device comprising a rotatable shaft, an indicating plate associated with the shaft, a track having concentric convolutions and associated with said plate, a rider arm rotatable with said shaft and normally engaging said track, projections extending from said plate and engaging the path of said rider arm, and a sounding device actuated by contact between said rider arm and said projections, said plate having openings extending therethrough for the insertion of pins with projections, and a pointer attached to said shaft and positioned on the opposite side of said plate from said arm and rotatable with said shaft.

4. A time measuring device comprising a rotatable shaft, an indicating plate associated with the shaft, a track having concentric convolutions and associated with said plate, a rider arm rotatable with said shaft and normally engaging said track, projections extending from said plate and engaging the path of said rider arm, and a sounding device actuated by contact between said rider arm and said projections, said sounding device being attached to the rider arm and having a knocker actuated by said projections into audible contact with said indicating plate.

5. A time measuring device comprising a rotatable shaft, an indicating plate associated with the shaft, a track having concentric convolutions and associated with said plate, a rider arm rotatable with said shaft and normally engaging said track, projections extending from said plate and engaging the path of said rider arm, and a sounding device having a knocker audibly actuated into engagement with said plate by contact between said rider arm and said projections, said rider travelling along successive convolutions of the track during successive rotations of the shaft.

6. A time measuring device comprising a rotatable shaft, a plate associated with the shaft, a track having concentric convolutions and associated with said plate, a rider arm rotatable with said shaft and having a lug normally engaging said track, projections adjustably mounted in said plate outside said track and engaging the path of said rider arm, a signalling device actuated by passage of said rider arm past said projections, in which the rider travels along successive convolutions of the track during successive rotations of the shaft.

7. A time measuring device comprising a rotatable shaft, a plate associated with the shaft, a track having concentric convolutions and associated with said plate, a rider arm rotatable with said shaft, and having a lug normally engaging said track, projections adjustably mounted in said plate and engaging the path of said rider arm, a signalling device actuated by passage of said rider arm past said projections, in which the rider travels along successive convolutions of the track during successive rotations of the shaft, and an obstruction in a convolution of the track for axially moving the rider lug and disengaging it from the track.

8. A time measuring device as described in claim 7, having an instrumentality for rotating the shaft.

9. A time measuring device as described in claim 1, said frame having a signal-tripper extending therefrom, said plate having a window which registers with the path of a signal arm, and a signal arm actuated into signalling position during a convolution of the cycle of travel of said rider arm by engagement with said signal-tripper.

10. A time measuring device as described in claim 1, said frame having a signal-tripper extending therefrom, said plate having a window which registers with the path of a signal arm, a signal arm actuated by said signal-tripper into signalling position during a shorter period than the entire path of travel of said rider in said track, a second sounding device actuated by the motion of said signal arm into the signalling position.

11. In a time measuring device, a rotatable shaft, a plate associated therewith, a track arranged in concentric convolutions, adjustable projections arranged on the inner face of said plate radially from said shaft and outside said track, and a rider arm rotatable with said shaft, said rider arm carrying a slidable frame having a lug which normally engages said track and a sounding device adapted to engage said projections, means for disengaging the lug from the track, and means for returning the disengaged lug to an inner convolution of the track.

12. In a time measuring device as described in claim 11, the distance between said lug and said sounding device being fixed.

13. In a time measuring device as described in claim 11, the distance between said lug and said sounding device being constant, said projections being arranged along a path corresponding in shape to said track and externally of said track.

14. A time measuring device as described in claim 1, said track being curved in cross section along its top edge.

15. In a time measuring device, a rotatable shaft, a plate associated therewith, a track arranged in concentric convolutions, adjustable projections arranged on the inner face of said plate radially from said shaft, and a rider arm rotatable with said shaft, said rider arm having a lug which normally engages said track and a sounding device adapted to engage said projections, said rider arm being movable axially and radially of said shaft, the distance between said lug and said sounding device being constant, the outer convolution of said track having an obstruction to disengage said lug from said track and means for re-engaging said lug with the innermost convolution of said track.

16. In a time measuring device, a rotatable shaft, a plate associated therewith, a track arranged in concentric convolutions, adjustable projections arranged on the inner face of said plate radially from said shaft, and a rider arm rotatable with said shaft, said rider arm having a lug which normally engages said track and a sounding device adapted to engage said projections, said rider arm being movable axially and radially of said shaft, a second fixed sounding device engageable with said rider arm during only the travel of said lug within the innermost convolution of said track.

17. In a time measuring device, a rotatable shaft, a plate associated therewith, a track arranged in concentric convolutions, adjustable projections arranged on the inner face of said plate radially from said shaft, and a rider arm rotatable with said shaft, said rider arm having a lug which normally engages said track and a sounding device adapted to engage said projections, said rider arm being movable axially and radially of said shaft, a second fixed sounding device engageable with said rider arm during only the travel of said lug within the innermost convolution of said track, said first and second named sounding devices emitting different frequencies.

18. A time measuring device comprising a rotatable shaft, a plate associated with the shaft, a track having concentric convolutions and associated with said plate, a rider arm rotatable with said shaft, and having a track follower normally engaging said track, projections adjustably mounted in said plate and engaging the path of said rider arm, a signalling device actuated by passage of said rider arm past said projections, in which the rider travels along successive convolutions of the track during successive rotations of the shaft, and an obstruction in a convolution of the track for axially moving the track follower and disengaging it from the track.

19. In a time measuring device, a rotatable shaft, a plate associated therewith, adjustable projections arranged on the inner face of said plate, a rider arm rotatable with said shaft, said rider arm having an elevator frame, means actuated by rotation of the shaft for advancing said frame along said arm, a sounding device supported by said frame and actuated by said projections during rotation of the shaft, and means for returning the elevator frame to its original position during a selected cycle of said shaft.

20. In a time measuring device, a rotatable shaft, a plate associated with said shaft and having a plurality of sets of adjustable projections arranged in paths of concentric convolutions on a face of said plate, a rider arm rotatable with said shaft, said rider arm having a frame movable lengthwise thereof, means actuated by rotation of the shaft for advancing the frame along the arm, a sounding device supported by the frame and actuated by different sets of projections during successive cycles of said shaft, and means for returning the frame to a retracted position during a selected cycle of the shaft.

WILLIAM EARL DUNCAN.

REFERENCES CITED

The following references are of record in the file of this patent:

UNITED STATES PATENTS

| Number | Name | Date |
|---|---|---|
| 1,091,486 | Cutler | Mar. 31, 1914 |
| 2,029,667 | Maxwell | Feb. 4, 1936 |